(12) United States Patent
Kostka et al.

(10) Patent No.: US 11,181,010 B2
(45) Date of Patent: Nov. 23, 2021

(54) AIRCRAFT ENGINE AND AIR-OIL SEPARATOR SYSTEM THEREFORE

(71) Applicant: PRATT & WHITNEY CANADA CORP., Longueuil (CA)

(72) Inventors: Richard Kostka, Bolton (CA); David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 106 days.

(21) Appl. No.: 16/460,067

(22) Filed: Jul. 2, 2019

(65) Prior Publication Data

US 2021/0003206 A1 Jan. 7, 2021

(51) Int. Cl.

| F01D 25/18 | (2006.01) |
|---|---|
| F16H 57/04 | (2010.01) |
| F02C 7/32 | (2006.01) |
| F02C 7/06 | (2006.01) |
| F16H 57/027 | (2012.01) |
| B64D 33/00 | (2006.01) |
| F16N 39/00 | (2006.01) |
| B01D 45/12 | (2006.01) |
| F16H 57/02 | (2012.01) |

(52) U.S. Cl.
CPC .............. *F01D 25/18* (2013.01); *B01D 45/12* (2013.01); *B64D 33/00* (2013.01); *F02C 7/06* (2013.01); *F02C 7/32* (2013.01); *F16H 57/027* (2013.01); *F16H 57/0404* (2013.01); *F16N 39/002* (2013.01); *F05D 2260/608* (2013.01); *F05D 2260/609* (2013.01); *F05D 2260/98* (2013.01); *F16H 2057/02043* (2013.01); *F16N 2039/007* (2013.01)

(58) Field of Classification Search
CPC .............. F01D 25/18; F05D 2260/609; F05D 2260/98; F16N 39/002; F16N 2039/007; B01D 45/12
See application file for complete search history.

(56) References Cited

U.S. PATENT DOCUMENTS

| 3,378,104 | A | | 4/1968 | Venable |
|---|---|---|---|---|
| 4,046,222 | A | | 9/1977 | Skrivanek et al. |
| 4,531,358 | A | | 7/1985 | Smith |
| 6,033,450 | A | * | 3/2000 | Krul ....................... B01D 45/14 55/345 |
| 7,063,734 | B2 | * | 6/2006 | Latulipe ............... B01D 50/002 96/189 |
| 8,348,017 | B2 | * | 1/2013 | Dickie .................. F16N 39/002 184/6.11 |
| 8,657,931 | B2 | * | 2/2014 | Short ..................... F01M 13/04 95/270 |
| 9,028,576 | B2 | * | 5/2015 | Slayter ..................... F02C 7/32 55/405 |
| 2009/0120296 | A1 | * | 5/2009 | Saito .................. B01D 19/0057 96/174 |

* cited by examiner

*Primary Examiner* — Ninh H. Nguyen
(74) *Attorney, Agent, or Firm* — Norton Rose Fulbright Canada LLP

(57) ABSTRACT

The aircraft engine can have an air-oil separator having an air-oil mixture inlet, an oil outlet, an air outlet, and a pressure relief path provided fluidly in parallel with the air-oil separator, between the air-oil mixture inlet and the air outlet, the pressure relief path can have a pressure relief valve for evacuating air-oil mixture to the exhaust duct in the event of excess pressure in the auxiliary gearbox.

20 Claims, 4 Drawing Sheets

AIRCRAFT ENGINE AND AIR-OIL SEPARATOR SYSTEM THEREFORE

TECHNICAL FIELD

The application related generally to gas turbine engines and, more particularly, to air-oil separators thereof.

BACKGROUND OF THE ART

In certain operating conditions, the flow through the air-oil separator can exceed capacity. If the air-oil separator is in an accessory gearbox for instance, this can lead to an undesired increase in pressure in the accessory gearbox. Increasing the capacity of the air-oil separator can alleviate this issue, but at the expense of an increase in weight and/or cost. Accordingly, there remained room for improvement.

SUMMARY

In one aspect, there is provided an aircraft engine comprising an air-oil separator having an air-oil mixture inlet, an oil outlet, an air outlet, and a pressure relief path provided fluidly in parallel with the air-oil separator, between the air-oil mixture inlet and the air outlet, the pressure relief path having a pressure relief valve.

In another aspect, there is provided an air-oil separator for an aircraft engine, the air-oil separator having a rotary shaft configured to be assembled into an accessory gearbox, an annular housing concentric to a rotary shaft, the annular housing having a separator media therein, an air-oil mixture inlet leading into the annular housing, an oil outlet provided radially outwardly through the annular housing, an air outlet provided radially inwardly through the annular housing and leading into an axial conduit formed inside the shaft and leading outside of the accessory gearbox, a bypass conduit formed axially inside the shaft, provided in parallel with the air-oil separator, the bypass conduit communicating with the axial conduit via pressure relief valve.

In a further aspect, there is provided a method of evacuating pressure from an accessory gearbox of a gas turbine engine, the method comprising, simultaneously and in parallel: conveying an air-oil mixture across a separator media of an air-oil separator, and out from the accessory gearbox; and conveying the air-oil mixture directly out from the accessory gearbox across a pressure relief valve, against a biasing force of the pressure relief valve; until the pressure becomes weaker than the biasing force of the pressure relief valve.

DESCRIPTION OF THE DRAWINGS

Reference is now made to the accompanying figures in which.

DETAILED DESCRIPTION

Figure 1:
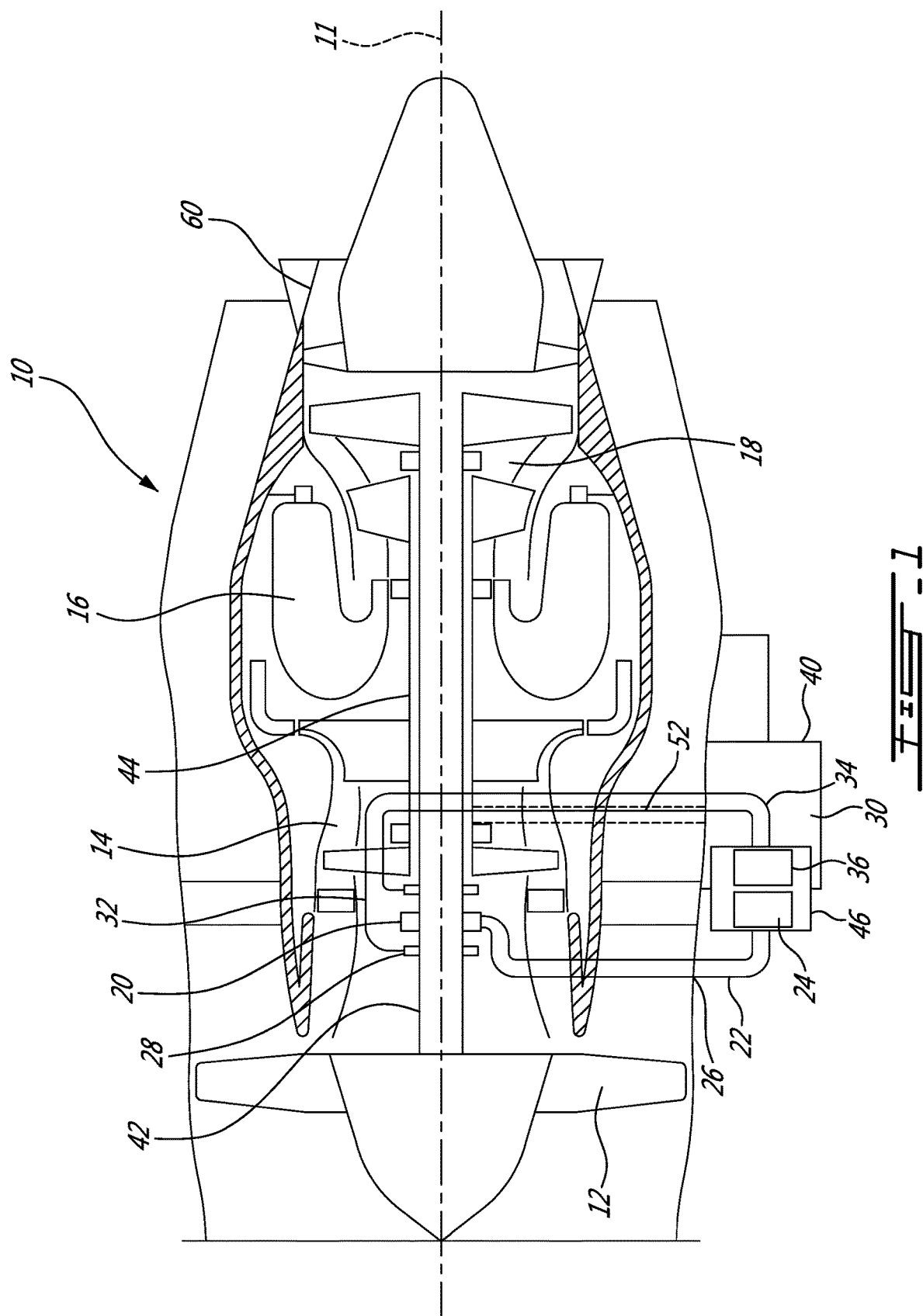
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to contain the oil. A scavenge system 30 having cavities 32, conduits 34, and one or more scavenge pumps 36, is used to recover the oil, which can be in the form of an oil foam at that stage, from the bearings 20.

The gas turbine engine also has an accessory gearbox 40 which derives power from a corresponding one of the shafts 42, 44. The accessory gearbox 40 can be positioned in a lower portion of the gas turbine engine 10, and can have a sump 40 lower than the oil level in an oil tank. One or more intermediary shafts and gearing can provide power to the accessory gearbox 40. In this example, a vertical intermediary shaft 52 having gears engaged with corresponding gears on the corresponding compressor/turbine rotor can be engaged, in the accessory gearbox, with a gearbox shaft (see FIG. 2), via appropriate gearing (not shown). The shaft 62 can power various accessories of the gas turbine engine 10, such as electrical generators, oil and fuel pumps, and/or hydraulic pumps through a gear train, or receive power from an engine starter, for instance. The gear train can require oil for lubrication. The oil tank 46 can be external or internal.

The accessory gearbox 40 can be installed under the main engine casing, or at another low point on the engine architecture. The oil tank can be attached to the AGB 40 or mounted above it onto the engine casing, to name two examples. A scavenge pump 36 can be used to pump oil from the sump of the accessory gearbox 40 back into the oil tank 46. The scavenge pump 36 can be powered by the output shaft of the accessory gearbox 40.

Figure 2:
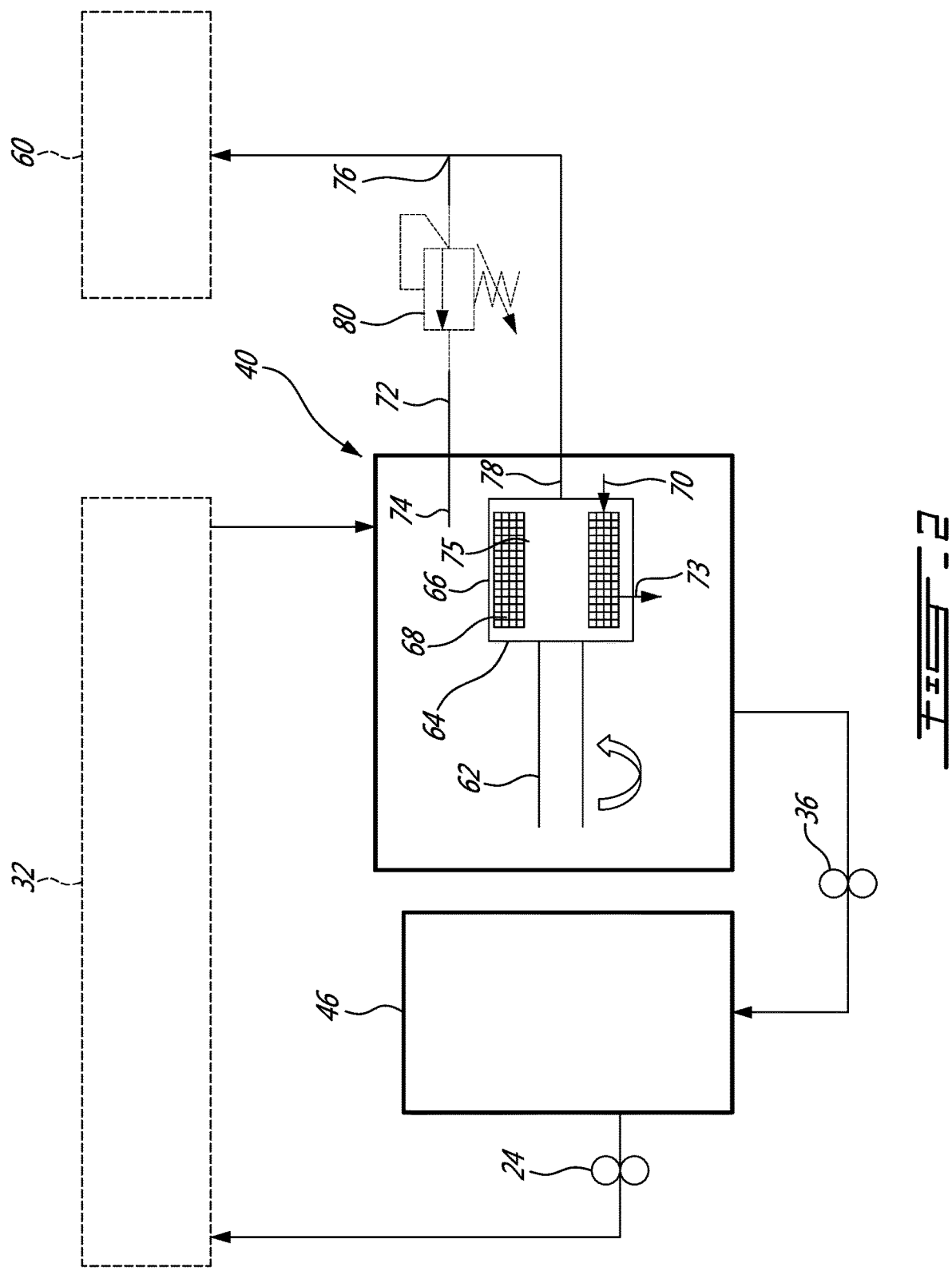
FIG. 2 is a block diagram of an accessory gearbox having an air-oil separator.

FIG. 2 shows a simplified block diagram of an accessory gearbox 40, oil tank 46, scavenge pump 36 and main pump 24, in accordance with an embodiment. An air-oil separator 64 has an annular housing 66 concentric to the rotary shaft 62 and configured to rotate with the shaft 62. The rotation of the shaft 62 can impart centrifugal acceleration in the air-oil separator 64 which can be a factor separating the heavier oil, typically evacuated radially outwardly, from the lighter air, typically evacuated radially inwardly via a conduit formed axially in the shaft 62. The annular housing 66 of the air-oil separator 64 can be manufactured as one or more components which are later assembled to the shaft 62, or can be manufactured integrally with the shaft, such as by 3D printing or moulding, for instance. The air-oil separator 64 typically has an air-oil separator media 68, such as a wire mesh for instance, provided inside the annular housing 66, to increase the efficiency of the centrifugal air-oil separating effect. The inlet of the air-oil separator, which can be referred to as the air-oil inlet 70, can be axial, for instance. Some air-oil separators have more complex designs and can include more than one separation stage, for instance.

In the illustrated embodiment, the path formed through the air-oil separator 40, and extending more specifically from the air-oil separator inlet 70 to the air-oil separator outlet 78 can be referred to as the primary air path 75. The air-oil separator can have an radially-outward oil outlet 73. A pressure relief path 72, which can be considered as forming a secondary air path in this embodiment, is provided fluidly in parallel to the primary air path 75. In other words, the pressure relief path 72 can have an inlet 74 open to a first fluidic environment, the air-oil separator inlet 70 also being open to the first fluidic environment. The pressure relief path 72 can have an outlet 76 open to a second fluidic environment, the air outlet 78 of the air-oil separator also being open to the second fluidic environment. It can be preferred, for various reasons, that the air outlet 78 and the pressure relief path outlet 76 lead to an exhaust duct 60 of the gas turbine engine 10, for any remaining oil to be burned. The pressure relief path 72 is distinct, and thus partitioned, from the air-oil separator path (the latter path being between the inlet 70 and the air outlet 78 of the air-oil separator). Fluid flow through the pressure relief path can be controlled by a pressure relief valve 80. Accordingly, during operation, if the flow across the air-oil separator 64 exceeds the air-oil separator's capacity, and the pressure in the auxiliary gearbox 40 increases as a result of this condition, the increasing pressure can become stronger than a bias of the pressure relief valve 80, and force the pressure relief valve 80 into an open configuration. In the open configuration, a mixture of oil and air can directly exit the auxiliary gearbox 40, bypassing the air-oil separator 64, reducing the pressure in the auxiliary gearbox 40. The oil in the mixture of oil and air can be burned in the exhaust duct 60, which can be preferred to the alternative of sustaining the condition of excess pressure in the auxiliary gearbox 40. In practice, the outlets 76, 78 of the air-oil separator 64 and of the pressure relief path 72 can be combined into a single conduit or path leading to the exhaust duct 60, or to another location deemed satisfactory in the exact circumstances of use.

Figure 3A:
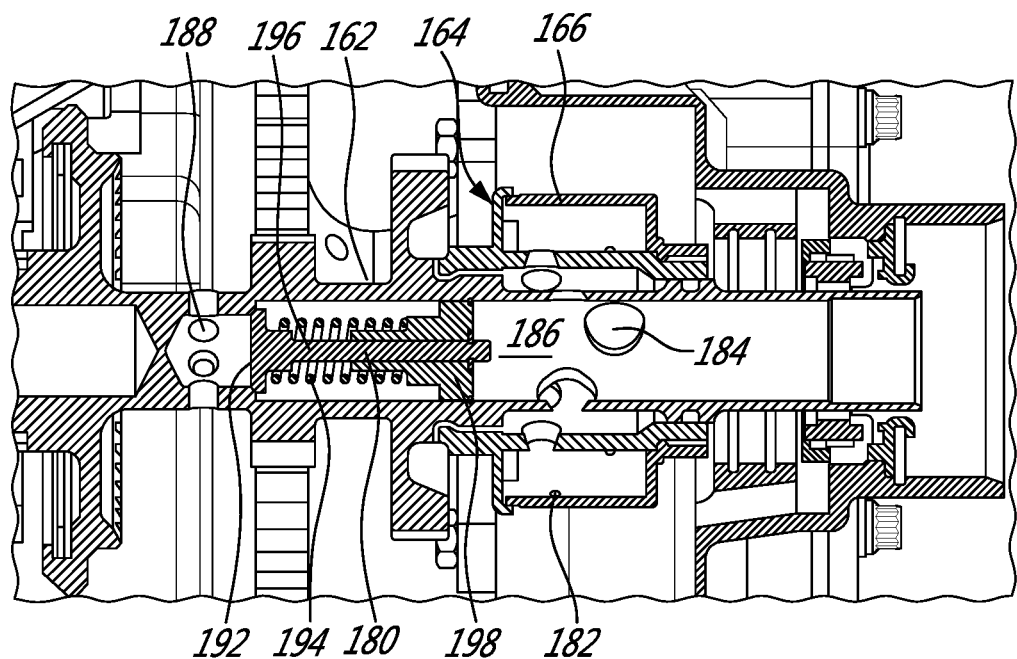
FIG. 3A is a cross-sectional view of an air-oil separator in an accessory gearbox, in accordance with an embodiment.
Figure 3B:
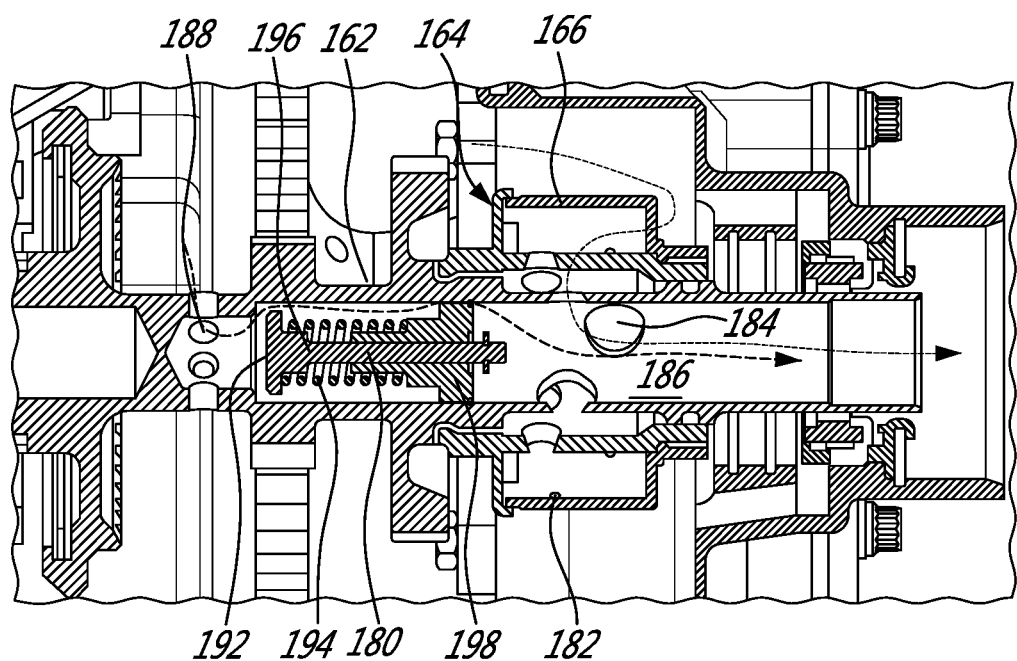
FIG. 3B is a view similar to FIG. 3A, showing a pressure relief valve in an open configuration, opening a bypass path to the air-oil separator.
Figure 4:
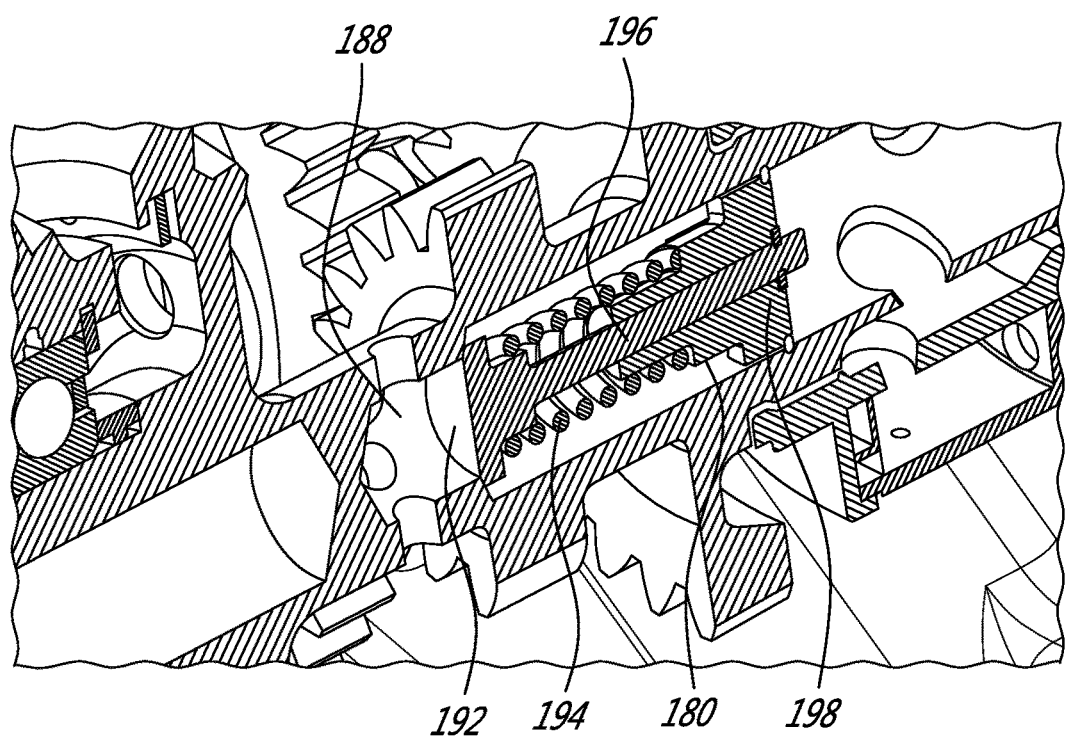
FIG. 4 is an oblique cross-section view of the accessory gearbox of FIG. 3A, showing the pressure relief valve, in greater detail.
Figure 5:
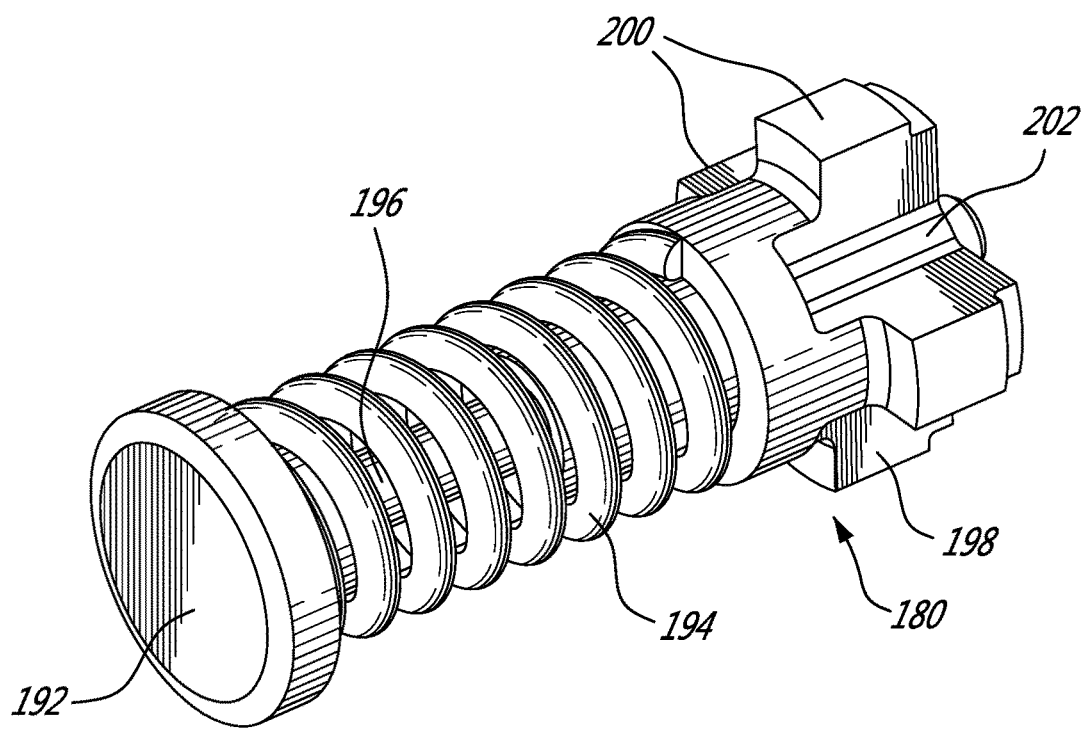
FIG. 5 is an oblique view of the pressure relief valve, shown alone.

FIGS. 3A to 5 show a specific example of a possible implementation. Referring first to FIG. 3A, the annular housing 166 of the air-oil separator 164 can have a plurality of apertures 170 in a radially-outer wall, forming a radially outward oil outlet, and a plurality of apertures 184 in a radially-inner wall, forming a radially inward air outlet leading into a hollow cavity 186, forming a conduit, in the rotary shaft 162 to which the air-oil separator 164 is mounted.

In this example, the pressure relief path includes a bypass conduit 188 also formed axially inside the shaft 162, in a distinct, adjacent section of the shaft 162. The bypass conduit 188 communicates with the axial conduit 186 via a pressure relief valve 180. Accordingly, if pressure exceeds a given threshold in the auxiliary gearbox, it will displace a piston head 192 of the valve 180 against the bias exerted by a spring 194, slide a stem 196 of the piston inside a valve body 198 into the configuration shown in FIG. 3B, and allow the mixture of air and oil through the pressure relief valve 180, into the axial conduit 186. Some of these latter components are better shown in FIGS. 4 and 5. As more specifically shown in FIG. 5, the valve body 198 can have a plurality of circumferentially interspaced holding members 200 mounted to the shaft, and bypass openings 202 between the holding members 200.

Accordingly, a pressure relief valve can be provided inside the shaft that contains an air-oil separator in the AGB. This can allow an alternate path for the excess air to flow around the blocked air-oil separator. The air/oil mist flowing through this valve can exit to the same point that air/oil normally flowing through the AGB exits, which can avoid having to add a special AGB exhaust. The valve spring can be designed to open the valve at a preset point to avoid excess pressure in the AGB; the oil tank can be vented to the AGB and can thus be protected as well. The valve system can be fully automatic and only function when excess pressure is detected, and re-set when the pressure returns to normal; which can be a relatively quick occurrence, once the excess oil is blown out the separator/valve assembly. It will be noted that in the illustrated embodiment, the inlet of both the pressure relief path and of the air-oil separator are in the AGB and are configured to receive a mixture of air and oil therefrom. It will also be noted that in the illustrated embodiment, the outlet paths of both the air-oil separator and of the pressure relief path combine, and are combined in a conduit extending outside the AGB.

The pressure relief path can be retrofit into an existing engines, such as when embodied in a manner similar to the one shown in FIGS. 3A to 5, simply by changing a rotary shaft to one which incorporates a bypass conduit with a pressure relief valve. The system can be self-contained within the AGB breather shaft.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft engine comprising an air-oil separator having an air-oil mixture inlet, an oil outlet, an air outlet in fluid flow communication with an environment outside the aircraft engine, a primary air path extending from the air-oil mixture inlet to the air outlet, and a pressure relief path provided fluidly in parallel with the primary air path, the pressure relief path having a relief outlet in fluid flow communication with the environment, the pressure relief path having a pressure relief valve.

2. The aircraft engine of claim 1 wherein the relief outlet fluidly combines with the air outlet of the air-oil separator.

3. The aircraft engine of claim 2 wherein the air outlet of the air-oil separator and the relief outlet of the pressure relief path are fluidly connected to an exhaust duct of the aircraft engine.

4. The aircraft engine of claim 3 wherein the aircraft engine is a gas turbine engine having in serial flow communication a compressor section, a combustor, a turbine section, and the exhaust duct, the compressor section and turbine section having at least one rotor including compressor blades and turbine blades mounted to a common shaft.

5. The aircraft engine of claim 1 wherein the air-oil separator includes an annular housing concentric to a rotary shaft, the annular housing having a separator media therein, and a separator path extending from the air-oil mixture inlet to the outlets across the separator media.

6. The aircraft engine of claim 5 wherein the air-oil separator includes oil outlets provided radially outwardly of the annular housing and air outlets leading radially inwardly into a cavity extending axially within the rotary shaft.

7. The aircraft engine of claim 1 wherein the air-oil separator is provided inside an accessory gearbox.

8. The aircraft engine of claim 7 wherein the air-oil separator has an annular housing concentric to a starter shaft of the accessory gearbox.

9. The aircraft engine of claim 1 wherein the air-oil separator is mounted annularly around a rotary shaft.

10. The aircraft engine of claim 9 wherein the oil outlet is radially external to the air-oil separator, and the air outlet is radially internal to the air-oil separator, leading into an axial conduit formed inside the shaft.

11. The aircraft engine of claim 10 wherein the pressure relief path includes a bypass conduit formed axially inside the shaft, the bypass conduit communicating with the axial conduit via pressure relief valve.

12. The aircraft engine of claim 11 wherein the pressure relief valve has a piston head spring-biased against a valve seat, the piston having a stem slidingly mounted in a valve body.

13. The aircraft engine of claim 12 wherein the valve body has a plurality of circumferentially interspaced holding members mounted to the shaft, and bypass openings between the holding members.

14. The aircraft engine of claim 1 wherein the pressure relief path has an inlet open to a first fluidic environment of the air-oil mixture inlet, and wherein the relief outlet is fluidly communicating with a second fluidic environment of the air outlet, the pressure relief path being partitioned from a fluid path extending between the air-oil mixture inlet and the air outlet, across the air-oil separator.

15. An air-oil separator for an aircraft engine, the air-oil separator having a rotary shaft configured to be assembled into an accessory gearbox, an annular housing concentric to a rotary shaft, the annular housing having a separator media therein, an air-oil mixture inlet leading into the annular housing, an oil outlet provided radially outwardly through the annular housing, an air outlet provided radially inwardly through the annular housing and leading into an axial conduit formed inside the shaft and leading outside of the accessory gearbox, a bypass conduit formed axially inside the shaft, provided in parallel with the air-oil separator, the bypass conduit communicating with the axial conduit via pressure relief valve.

16. The aircraft engine of claim 15 wherein the pressure relief valve has a piston head spring-biased against a valve seat, the piston having a stem slidingly mounted in a valve body.

17. The aircraft engine of claim 16 wherein the valve body has a plurality of circumferentially interspaced holding members mounted to the shaft, and bypass openings between the holding members.

18. A method of evacuating pressure from an accessory gearbox of a gas turbine engine, the method comprising, simultaneously and in parallel:
conveying an air-oil mixture across a separator media of an air-oil separator, and outputting air from the air-oil mixture out from the accessory gearbox towards and environment outside the gas turbine engine; and
conveying the air-oil mixture directly out from the accessory gearbox across a pressure relief valve, against a bias of the pressure relief valve and flowing the air-oil mixture towards the environment while bypassing the air-oil separator;
until the pressure becomes weaker than the bias of the pressure relief valve.

19. The method of claim 18 wherein the air-oil mixture conveyed in parallel across the separator media and across the pressure relief valve are conveyed into an exhaust duct of the gas turbine engine.

20. The method of claim 19 further comprising combining the outputted air with the air-oil mixture conveyed across the pressure relief valve prior to reaching the exhaust duct.

* * * * *